UNITED STATES PATENT OFFICE.

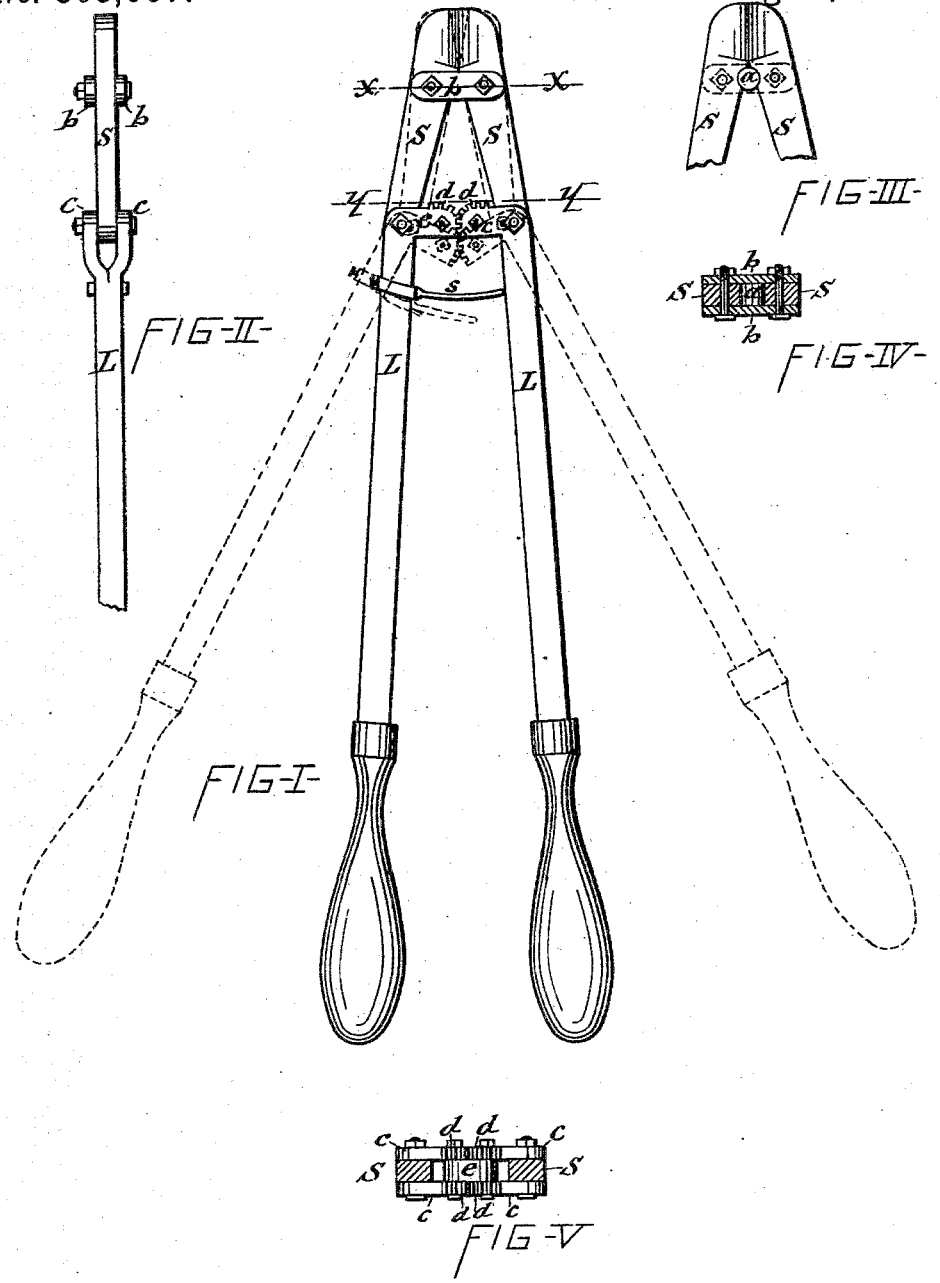

JAMES W. STOKES, OF SYRACUSE, NEW YORK.

BOLT AND RIVET CLIPPER.

SPECIFICATION forming part of Letters Patent No. 303,067, dated August 5, 1884.

Application filed April 11, 1884. (No model.)

*To all whom it may concern:*

Be it known that I, JAMES W. STOKES, of Syracuse, in the county of Onondaga, in the State of New York, have invented new and useful Improvements in Bolt and Rivet Clippers, of which the following, taken in connection with the accompanying drawings, is a full, clear, and exact description.

This invention consists in a novel construction and combination of the component parts of an implement by means of which rivets and bolts or wrought-metal bars can be cut in two with comparatively slight exertion of the operator.

The invention is fully illustrated in the annexed drawings, wherein Figure I is a plan view of my improved implement, showing it in two of its operative positions. Fig. II is an edge view of the cutting or main portion of the implement. Fig. III is a plan view of the cutting end of the shears, illustrating the joint between the two blades; and Figs. IV and V are transverse sections taken, respectively, on lines $x$ $x$ and $y$ $y$, Fig. 1.

Similar letters of reference indicate corresponding parts.

S S represent the shearing or cutting blades of the implement. Said blades are connected together by straps $b$ $b$, extended across opposite sides of the blades, and by bolts or rivets passing through them and allowing the necessary oscillatory movement of the blades. A pin, $a$, is interposed between the adjacent edges of the blades, and seated in recesses in said edges, as shown in Fig. III of the drawings, to prevent the blades from shifting longitudinally on each other. The straps $b$ $b$, lying over the ends of the pin $a$, confine the latter in position.

L L designate two levers, each formed with a laterally-deflected short arm, $c$, which is bifurcated and terminated with segmental gears $d$. The two levers are connected with each other by a link or block, $e$, fitted into the bifurcation of the arms $c$ $c$, and by bolts or rivets passing through said parts. Said block $e$ holds the geared ends $d$ $d$ of the lever movably interlocked with each other. In the bifurcated arms $c$ $c$, at their junction with the long arm of the levers L L, are pivoted, respectively, the shanks of the cutter-blades S S.

By operating the levers L L in the manner of shears, the blades S S receive a similar motion, although considerably reduced, but correspondingly increased in power, owing to the proportion of the length of the two arms of the levers, which have their fulcrum at the pivot of the short arm $c$ on the coupling-link $e$. In operating the levers as aforesaid, the interlocking-segments $d$ $d$ compel said levers to work in unison. A suitable stop, $s$, is connected to one of the levers, and arranged to encounter the other lever in due time to arrest the motion of the levers when the cutting-edges of the shears S S meet.

Having described my invention, what I claim is—

The combination of the levers L L, formed with the laterally-deflected bifurcated short arm $c$, terminating in segments $d$, the coupling-link $e$, connecting the two short arms, the blades S S, pivoted in the bifurcated arms at or near their junction with the long arms of the levers, the pin $a$, interposed between the edges of the blades, and the straps $b$ $b$, lying over said pin and connecting the two blades, all constructed and combined substantially in the manner described and shown.

In testimony whereof I have hereunto signed my name and affixed my seal, in the presence of two attesting witnesses, at Syracuse, in the county of Onondaga, in the State of New York, this 31st day of March, 1884.

JAMES W. STOKES. [L. S.]

Witnesses:
FREDERICK H. GIBBS,
C. BENDIXON.